US008060015B2

(12) United States Patent
Meckesheimer et al.

(10) Patent No.: US 8,060,015 B2
(45) Date of Patent: Nov. 15, 2011

(54) DYNAMIC SEAT LABELING AND PASSENGER IDENTIFICATION SYSTEM

(75) Inventors: Martin Meckesheimer, Seattle, WA (US); Ramzy Boutros, Maple Valley, WA (US); Bruce G. Loosli, Irvine, CA (US)

(73) Assignee: The Boeing Company, Chicago, IL (US)

( * ) Notice: Subject to any disclaimer, the term of this patent is extended or adjusted under 35 U.S.C. 154(b) by 984 days.

(21) Appl. No.: 11/939,321

(22) Filed: Nov. 13, 2007

(65) Prior Publication Data

US 2008/0062135 A1 Mar. 13, 2008

Related U.S. Application Data

(63) Continuation-in-part of application No. 10/707,965, filed on Jan. 28, 2004, now abandoned.

(51) Int. Cl.
*H04B 7/00* (2006.01)
*H04W 4/00* (2009.01)

(52) U.S. Cl. ....................................... 455/41.2; 455/431

(58) Field of Classification Search ........................ None
See application file for complete search history.

(56) References Cited

U.S. PATENT DOCUMENTS

| | | | | |
|---|---|---|---|---|
| 4,896,209 | A | 1/1990 | Matsuzaki et al. | |
| 5,697,061 | A | 12/1997 | Krueger et al. | |
| 5,785,283 | A * | 7/1998 | Ehrenberger et al. | 246/62 |
| 5,977,998 | A | 11/1999 | Brechle et al. | |
| 6,056,199 | A | 5/2000 | Wiklof et al. | |
| 6,118,426 | A * | 9/2000 | Albert et al. | 345/107 |
| 6,192,890 | B1 | 2/2001 | Levy et al. | |
| 6,633,225 | B1 | 10/2003 | Isomichi et al. | |
| 6,753,830 | B2 * | 6/2004 | Gelbman | 345/55 |
| 6,964,481 | B2 | 11/2005 | Pho et al. | |
| 7,028,304 | B1 * | 4/2006 | Weinberger et al. | 719/310 |
| 2002/0045030 | A1 | 4/2002 | Ozin et al. | |
| 2005/0132305 | A1 * | 6/2005 | Guichard et al. | 715/855 |

FOREIGN PATENT DOCUMENTS

| | | | |
|---|---|---|---|
| DE | 29608032 | U1 | 5/1996 |
| EP | 0659625 | A1 | 11/1994 |
| JP | 2002007525 | | 1/2002 |

(Continued)

OTHER PUBLICATIONS

Ashruf, Colin, "Phillips Finds an E-Paper Technology That's Quicker on the Draw", http://www.smalltimes.com, Jan. 6, 2004.

(Continued)

*Primary Examiner* — Yuwen Pan
*Assistant Examiner* — Ayodeji Ayotunde
(74) *Attorney, Agent, or Firm* — Ostrager Chong Flaherty & Broitman P.C.

(57) ABSTRACT

A placard for displaying a customer specific message includes a receiver, a capacitor, and an electronic updateable static display. The receiver has a memory storing an identification code and an antenna for receiving a signal. The capacitor is coupled to the receiver and capable of being charged by the signal. The electronic updateable static display is coupled to the receiver, is powered by the capacitor and is capable of displaying customer specific messages when a portion of the signal matches the identification code of the placard. The coupling means are conventional and the methods for affixing them are well known in to those skilled in the art. A method of using the placard for displaying a customer specific message is also provided.

17 Claims, 4 Drawing Sheets

FOREIGN PATENT DOCUMENTS

| | | | |
|---|---|---|---|
| WO | 99/62269 | A3 | 12/1999 |
| WO | 00/26761 | | 5/2000 |

OTHER PUBLICATIONS

Wasowicz, Lidia, “After 30 Years, the Promise of E-Paper Will be Tested”, http://www.smalltimes.com, Nov. 11, 2003.
“Pop-Sci Core 77 Design Challenge/Description Memory”, Jul. 16, 2003 http://www.core77.com/challenge/memory/pages13desc.htm.
See Gyricon, LLC http://www.gyriconmedia.com, Dec. 10, 2003.
See E Ink http://www.eink.com/cs/index.html, Jan. 16, 2004.
IEEE; 802.15 Standard Inerpretation http://grouper.ieee.org/groups/802/15, Jan. 16, 2004.
Gummi http://www.csl.sony.co.jp/IL/members/schwesig/subcontents/contents.html, Jan. 16, 2004.
Arsenault, Andre C., et al; A Polychromic, Fast Response Metallopolymer Gel Photonic Crystal with Solvent and Redox Tunability: A Step Toward Photonic Ink (P-Ink); Advanced Materials, vol. 15, Issue 6, Mar. 17, 2003, pp. 503-507, Wiley-VCH Verlag GmbH & Co. KGaA, Weinheim, Germany.
Wasowicz, Lidia, “Moving Pictures Coming to E-Paper Near You”, http://www.smalltimes.com, Sep. 26, 2003.
Ball, Philip, “Ball Games”, http://www.chemsoc.org/, Oct. 27, 2003.
Ball, Philip, “Ink Changes Colour at Flick of a Switch”, http://www.nature.com, Mar. 18, 2003.

* cited by examiner

DYNAMIC SEAT LABELING AND PASSENGER IDENTIFICATION SYSTEM

The application is a continuation-in-part of application Ser. No. 10/707,965.

BACKGROUND

The present invention relates generally to seat labeling, and more particularly, to a system for dynamic seat labeling by displaying customer specific messages.

Reserved seats are commonplace in theaters, stadiums, airplanes, trains, and other common carriers. Reserved seats are becoming more common in movie theaters and other venues where seating is on a first come first served basis. The reserved seat enables a person to reserve an unoccupied seat for a particular purpose, event or duration without concern of being the first to reach the seat.

Reserved seats typically are pre-assigned and associated with a ticket, record locator, or other identifier. Other times, for example in the airline industry, the reserved seat is also associated with the particular identity of the person to whom the reserved seat was issued. The ticket holder is given the right to occupy the reserved seat for the event to which the reserved seat is assigned. The ticket holder of this reserved seat either presents the ticket and is directed towards the seat or is allowed to find the seat on his/her own.

When the ticket holder of the seat is allowed individually to find the seat, a delay is often created. One reason for the delay is because the seat configuration may be confusing to the ticket holder. Another reason for the delay is because the location of the seat number or seat marker is not readily identifiable with the correct seat. Yet another reason for the delay is because the ticket holder has to stop and search for the reserved seat. Lastly, the ticket holder simply forgets his seat number and sits in the wrong seat causing confusion among the other patrons which results in an additional delay.

The delay by the ticket holder in locating and occupying the correct seat may increase the total turn-time of an event. The turn-time is increased when the time to occupy a facility or board a vehicle increases because of the delay caused by the individual ticket holders. One example is in the airline industry. The airplane turn-time at the gate is a critical issue for most airlines. When passengers enplane time increases, it affects the total turn-time by decreasing the number of turns, i.e., events that can be accomplished in a given duration. Turn-times are important because they relate to when the next activity may begin and are often one of the limiting factors in critical path scheduling. Also, the inability to find the correct seat may cause dissatisfaction among or between ticket holders. Therefore, there is a need to have a dynamic system for seat identification that lessens the uncertainty of locating the correct seat in a timely fashion.

It would be beneficial to use existing technology in a novel and inventive way to solve or improve the uncertainty of locating an assigned seat. Electronic paper and RF tag technologies may help in this regard.

Electronic paper is a developing technology and includes digital ink, electronic ink, digital paper, electronic paper, and other types of electronic displays now being developed. The electronic paper may change an image upon a display when a power source is available and will hold the image upon the display when a power source is unavailable.

One type of electronic paper is photonic ink. Photonic ink is a substance called P-Ink or "photonic ink", and is described in the paper: Arsenault, A. C., Miguez, Hi, Kitaev, V., Ozin, G. A. & Manners, I. A.: "A Polychromic, Fast Response Metallopolymer Gel Photonic Crystal with Solvent and Redox Tunability A Step Towards Photonic Ink; Advanced Materials", in press, 17 Mar. 2003. The photonic ink may change an image upon a display when a power source is available and will hold the image upon the display when a power source is unavailable. The first developed electronic inks have a black and white mode and the newer photonic inks have a color mode. The ink's mode for displaying an image depends upon a process called diffraction. The ink contains nanospheres of silicon dioxide that form colloidal crystals. When light bounces off the colloidal crystals, interference eliminates some wavelengths, giving the reflected light a certain color. To make the color of the ink tunable, a polymer gel is packed between the colloidal crystals. This gel swells when it is soaked in solvent and shrinks when it dries. The nanospheres" spacing dictates the wavelength of light that they reflect, so swelling changes the film's color of the image by shifting the color spectrum. The swelling gel conducts electricity. Applying a voltage makes it increasingly positively charged, which determines how much solvent it sucks up and the color displayed. Altering the voltage tunes the image. Removing the voltage freezes the gel, which statically holds the image on the display.

Radio Frequency Identification (RFID) uses transponders, usually called RF Tags, which have an antenna and chip with memory. Its history can be traced back to "friend or foe" transponders (transmitter responder) fitted to aircraft in World War II, through scientific work in the 70s, to animal identification tags introduced in USA and UK in the 80s. Growth in the 90s was rapid particularly in two fields, access control (contactless identification passes) and car security. Many modern car keys contain an RFID transponder that is recognized by a circuit in the steering column.

A basic RFID system comprises an antenna or coil, a transceiver (with decoder), and a transponder (RF tag) electronically programmed with unique information. Often the antenna is packaged with the transceiver and decoder to become a reader (a.k.a. interrogator), which can be configured either as a handheld or a fixed-mount device. The reader emits radio waves depending upon its power output and the radio frequency used. When an RF tag passes through the electromagnetic zone, it detects the reader's activation signal. The reader decodes the data encoded in the tag's integrated circuit and the data is passed to the host computer for processing.

RF tags are categorized as either active or passive. Active RF tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and a limited operational life.

Passive RF tags operate without a separate external power source and obtain operating power generated from the reader. Passive tags are consequently much lighter than active tags, less expensive, and offer a virtually unlimited operational lifetime. The trade off is that they have shorter read ranges than active tags and require a higher-powered reader.

It would be desirable to provide a placard that is updateable and displays a customized message without a direct power source. It is also desirable to provide a placard that can reduce the uncertainty of locating a reserved seat.

SUMMARY OF INVENTION

A placard of the present embodiment is a combination of an electronic updateable static display, a RF tag that directs its output to the display, and an antenna.

In one embodiment, the placard is used to create a seat shoulder mounted display that displays the seat number and the name of the passenger who has reserved that seat. Each placard may fit into sleeves on the seat shoulder so that it may be removed and reinserted when seat covers are removed and replaced. The placard may also be placed on other seating locations or assigned to multiple seating locations.

In another embodiment, airline seat reservation data is downloaded to an on-board system that sends one or more signals to RF placards mounted on or near each seat shoulder. Each placard is unique in that it has its own identification and is associated to a seating location on the airplane. Each placard receives the signal containing the name of the passenger who has reserved that seat. The transmitted signal from the antenna also charges a capacitor in the placard. When the capacitor discharges, the power is used to power the electronic updateable static display by resetting the display to display the passenger's name and reserved seat location. The transmitted signals are required at least once each flight-leg to update the displays as passengers leave and others take their seats. This disclosure combines the electronic updateable static display technology, e.g., photonic ink, with RF-tag technology to create seat placards that are customizable for the passengers and are located in identifiable locations that assist each passenger in quickly finding his/her seat. Also, the placards are wireless, which eliminates the need for a wiring harness to each seating location.

In another embodiment, a placard for displaying a customer specific message has a receiver, a capacitor, and an electronic updateable static display. The receiver has an identity and an antenna for receiving a signal. The capacitor is coupled to the receiver and capable of being charged by the signal. The electronic updateable static display is coupled to the receiver and powered by the capacitor and is capable of displaying a customer specific message when a portion of the signal matches the identity of the placard.

In still another embodiment, the placard comprises a receiver having a memory storing an identification code and an antenna for receiving a signal which comprises a first portion for identification and a second portion for a first customer specific message. A capacitor is coupled to the receiver. At least one coupler is connected to an in-flight entertainment system and/or an airline reservation system and/or an airline boarding system and/or text messaging system for receiving a second customer specific message therefrom. An electronic updateable static display is coupled to the receiver and the at least one coupler and is powered by the capacitor for displaying the first and second customer specific messages when the first portion of the signal matches the identification code of the placard with the result that the capacitor is capable of being charged by the signal.

The method of using the placard for displaying a customer specific message may be accomplished by generating a signal having at least one placard identification and a customer specific message associated therewith, transmitting the signal, receiving the signal, charging a capacitor by harnessing the power from the transmitted signal and displaying the customer specific message on an electronic updateable static display using the power from the capacitor when a portion of the signal matches the placard's identification.

Other aspects and advantages will become apparent upon the following detailed description and appended claims, and upon reference to the accompanying drawings.

DETAILED DESCRIPTION

Figure 1A:
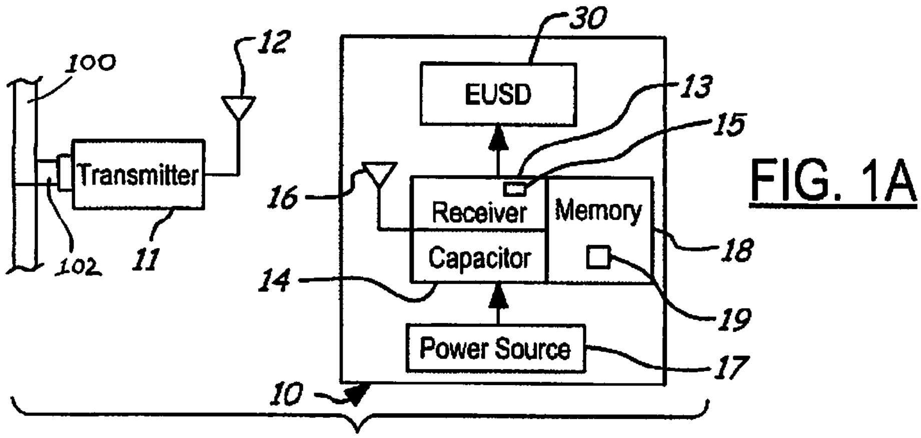
FIG. 1A is a block diagram showing the elements of a placard and a transmitter in accordance with one embodiment of the present disclosure.

In the following figures the same reference numerals will be used to identify the same components.

Referring now to FIG. 1A, a placard 10 and a transmitter 11 are shown in accordance with one embodiment of the present disclosure. The placard 10 is capable of receiving a signal from the transmitter 11 that transmits a signal 50 (shown in FIG. 4). Furthermore, the placard 10 is capable of harnessing the power from the signal 50 that is generated by the transmitter 11.

The placard 10 has a receiver 13, a capacitor 14, and an electronic updateable static display 30. The receiver 13 has a memory storing an identification code 15 and an antenna 16 for receiving a signal 50. The identification code 15 may have a generic device descriptive identity, a user specified identity, a unique identity, or any other type of identity known to a person skilled in the art. The identification code 15 is used in the placard 10 to awaken and execute a command as specified by the signal 50 when a portion of the signal 50 includes the corresponding identification code. The antenna 16 of the placard 10 receives the signal 50 and is coupled by means of a conventional coupler (not shown) to the receiver 13. The receiver 13 may be a RF receiver, an active RF receiver, a passive RF receiver, or any receiver also known to one of skill in the art.

As used herein, the term "coupler," "coupled," "coupling" and the like and the methodology for affixing them to particular items, such as receivers, antenna, transponders etc are well known in the art. WordNet for example, defines "coupling, coupler as a mechanical device that serves to connect the ends of adjacent objects." Couplers "are interconnected solutions for networks and telecommunication infrastructures, consumer electronics, data storage, medical and instrumentation applications. (FCI Internet Terms of Use). Couplers include modular plug in-line couplers, modular plug duplex T-adapters, male to male and female to female couplers and are available from multiple sources such as C.B.I., Belkin, FCI. "The term 'coupler' refers to a myriad of different types of sockets for plugging in electric or electronic cables or devices" (see Computer Desktop Encyclopedia© 1981-2007 by the Computer Language Company, Inc.) As afore-noted, the devices and the methodology for affixing them to particular items are well known in the art.

The capacitor 14 is coupled to the antenna 16 of the receiver 13. The capacitor 14 is capable of receiving a charge by harnessing the power from the electromagnetic field emitted by the transmitter 11 while transmitting the signal 50.

The electronic updateable static display (EUSD) 30 is coupled by a conventional coupler (not shown) to the receiver 13 and the capacitor 14. The electronic updateable static display 30 may be powered by the capacitor 14 when it receives a portion of a signal 50 communicated by the receiver 13. The electronic updateable static display 30 may display a customer specific message when a portion of the received signal 50 matches the identification code 15 of the placard 10. The customer specific message is transmitted with the portion of the signal 50 having the identification code 15 of the placard 10. The electronic updateable static display 30 may be of any type of display capable of being set with a message, which maintains the message as displayed until the message is dynamically updated, changed, cleared, or reset. The electronic updateable static display 30 may be an electronic paper display, a photonic ink display or any other type of display having an electronic updateable static attribute.

The placard 10 may have a power source 17 coupled to the capacitor 14. The power source 17 may be capable of augmenting the capacitor 14 to supply the necessary power for updating, changing, clearing, or resetting the display in the absence of a signal 50. The power source 17 ideally will have a life suited for the application in which the placard is used without replacing the power source. The power source 17 may be a battery, solar cell, hard wired to a central power supply or other sources known to a person in the art.

The placard 10 may have a memory 18 coupled by means of a conventional coupler to the receiver 13 for storing one or more messages for displaying upon the electronic updateable static display 30. The message(s) may be stored into memory while receiving a portion of the signal 50, may be preprogrammed into the memory, or received from a network coupled to it (such as an In-Flight Entertainment System).

The placard 10 may further comprise a timer 19 coupled to the memory 18 for initiating the one or more messages to be displayed upon the electronic updateable static display 30. The timer 29 may be used in any number of ways for initiating the one or more messages to be displayed. Specifically, it is anticipated that the timer will be initiated when the electronic updateable static display 30 is set with a message. Further it is anticipated that after a time, the electronic updateable static display 30 will be updated, changed, cleared, or reset by displaying one of the stored messages or an updated customer message. It is anticipated that the stored message(s) will be different from the customer specific message as transmitted or updated by a portion of the signal 50. It is anticipated that the display will use the power source 17 to display the stored message, unless the electromagnetic field is present or there is still energy left in the capacitor 14 with which to power the display.

Figure 1B:
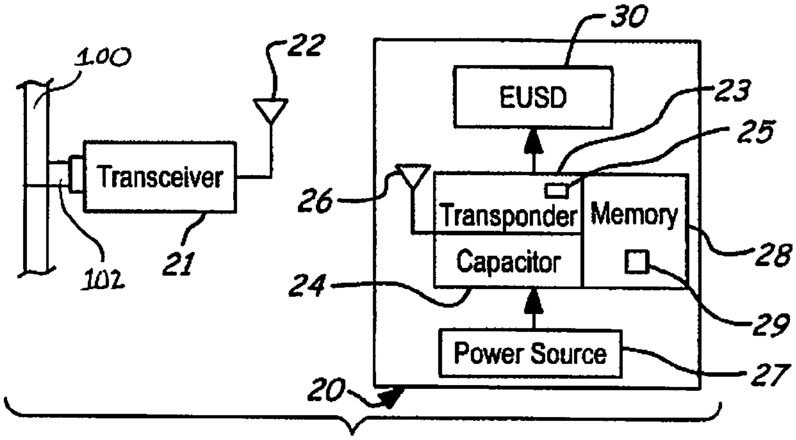
FIG. 1B is a block diagram showing the elements of a placard and a transceiver in accordance with another embodiment of the present disclosure.

FIG. 1B is a block diagram showing the elements of a placard 20 and a transceiver 21 in accordance with another embodiment of the present disclosure. The placard 20 is capable of receiving a signal from the transceiver 21 that transmits a signal 50 (shown in FIG. 4). Furthermore, the placard 20 is capable of harnessing the power from the signal 50 that is generated by the transceiver 21.

The placard 20 has a transponder 23, a capacitor 24, and an electronic updateable static display 30. The transponder 23 has a memory storing an identification code 25 and an antenna 26 for receiving a signal 50. The identification code 25 may have a generic device descriptive identity, a user specified identity, a unique identity, or any other type of identity known to a person skilled in the art. The identification code 25 is used in the placard 20 to awaken and execute a command as specified by the signal 50 when a portion of the signal 50 includes the corresponding identification code. The antenna 26 of the placard 20 receives the signal 50 and is coupled to the transponder 23. The transponder 23 may be a RF transponder or any other transponder known to one of skill in the art. The transponder 23 may be capable of acknowledging the receipt of a portion of the signal 50.

The capacitor 24 is coupled by a conventional coupling device well known to those skilled in the art to the antenna 26 of the transponder 23. The capacitor 24 is capable of receiving a charge by harnessing the power from the electromagnetic field emitted by the transceiver 21 while transmitting the signal 50.

The electronic updateable static display (EUSD) 30 is coupled using a conventional coupling device (not shown) to the transponder 23 and the capacitor 24. The electronic updateable static display 30 may be powered by the capacitor 24 when it receives a portion of a signal 50 communicated by the transponder 23. The electronic updateable static display 30 may display a customer specific message when a portion of the received signal 50 matches the identification code 25 of the placard 20. The customer specific message is transmitted with the portion of the signal 50 having the identification code 25 of the placard 20. The electronic updateable static display 30 may be of any type of display capable of being set with a message, which maintains the message as displayed until the message is dynamically updated, changed, cleared, or reset. The electronic updateable static display 30 may be an electronic paper display, a photonic ink display or any other type of display having an electronic updateable static attribute. Further, the transponder 23 may acknowledge the receipt of a portion of the signal 50 after the electronic updateable static display 30 has displayed the customer specific message by sending a reply signal back to the transceiver 21.

The placard 20 may have a power source 27 coupled using a conventional coupling device well known to those skilled in the art to the capacitor 24. The power source 27 may be capable of augmenting the capacitor 24 to supply the necessary power for updating, changing, clearing, or resetting the display in the absence of a signal 50. The power source 27 ideally will have a life suited for the application in which the placard is used without replacing the power source. The power source 27 may be a battery, solar cell, hard wired to a central power supply or other sources known to a person in the art.

The placard 20 may have a memory 28 coupled by means of a conventional coupling device to the transponder 23 for storing one or more messages for displaying upon the electronic updateable static display 30. The message(s) may be stored into memory while receiving a portion of the signal 50, may be preprogrammed into the memory, or received from a network coupled to it (such as an In-Flight Entertainment System).

The placard 20 may further comprise a timer 29 coupled using a conventional coupler well known and readily available to those skilled in the art to the memory 28 for initiating the one or more messages to be displayed upon the electronic updateable static display 30. The timer 29 may be used in any number of ways for initiating the one or more messages to be displayed. Specifically, it is anticipated that the timer will be initiated when the electronic updateable static display 30 is set with a new message. Further it is anticipated that after a time, the electronic updateable static display 30 will be updated, changed, cleared, or reset by displaying one of the stored messages or a new customer message. It is anticipated that the stored message(s) may be different from the customer specific message as transmitted or updated by a portion of the signal 50. It is anticipated that the display will use the power source 27 to display the stored message, unless the electromagnetic field is present or there is still energy left in the capacitor 24 in which to power the display.

The receiver has circuitry for determining whether the portion of the signal received matches the identification code of the placard. Alternatively, the circuitry for determining whether the portion of the signal received matches the identification code of the placard may reside in the EUSD's circuitry or elsewhere in the placard. The comparison circuitry may be of any design known to those of skill in the art.

Figure 2:
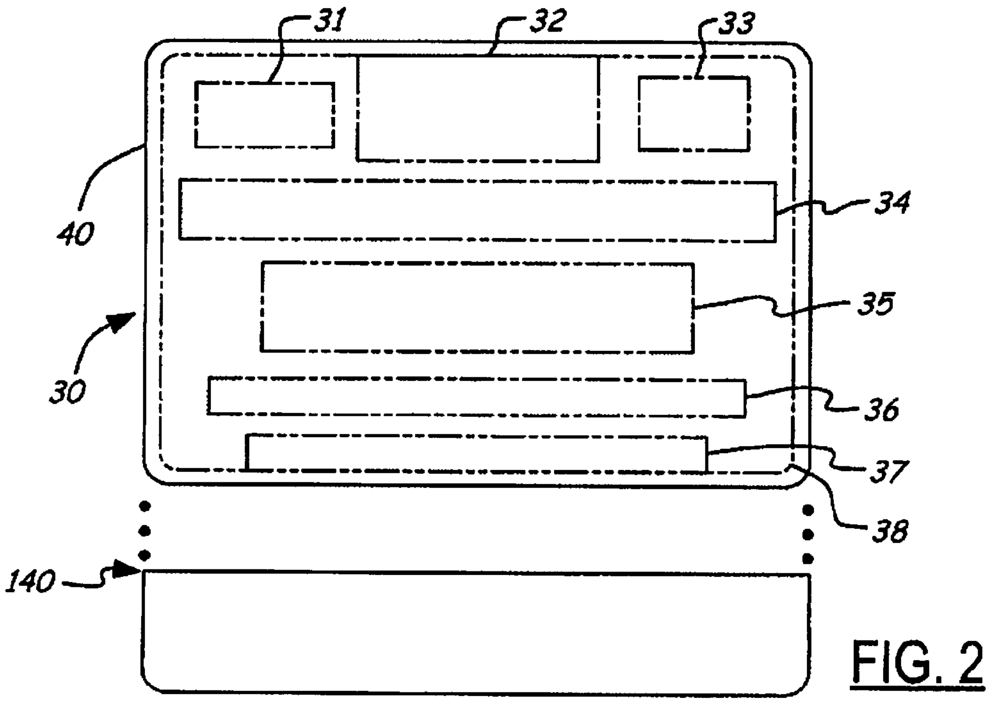
FIG. 2 is a frontal view of the placard showing the electronic updateable static display for displaying a message by using the present disclosure.

FIG. 2 is a frontal view of the placard 40 showing the electronic updateable static display 30 for displaying a message by using the present disclosure to advantage. One embodiment of the placard 40 has an electronic updateable static display 30 having a viewable field 38. The viewable field 38 maintains the displayed message until the message is updated, changed, cleared, or reset. The viewable field 38 is shown in this embodiment as having a single field in which a message may be displayed.

Optionally, the viewable field 38 may be parsed, separated, or aligned into multiple fields. Shown in this embodiment are seven optional fields 31-37 for displaying various messages. The inventors do not intend to limit the number of viewable fields. The multiple fields 31-37 are shown as rectangles, the fields need not have a rectilinear shape and they may conceivably be of any shape or form that is suitable for displaying messages.

The viewable field 38 or multiple fields may display words, symbols, texts, numerals, pictures or logos. The viewable field may be in a single language or multiple languages. The viewable field may be a customer specific message or a general information message. The information in each field may be editable or not editable.

Placards 40 may be combined together in any number to form a multiple placard 140. A multiple placard 140 has two or more placards 40 attached one to another. A multiple placard 140 may be used advantageously where there are common seating locations or difficulties in using individual placards.

Figure 3:
FIG. 3 is a plan view of the electronic updateable static display showing one example of a customer specific message in which the present disclosure is used.

FIG. 3 is a plan view of the electronic updateable static display 130 showing one example of a customer specific message. In this example the electronic updateable static display 130 has multiple fields 131-137. The first field 131 may be for identifying the type of placard, e.g., as a seat placard. The second field 132 may identify a location, in this example it is a seat location. Alternatively, field 132, or any other field, may display the location associated with the unique identification code 15, 25 of the placard 10, 20, 40, 140. The third field 133 may identify a logo. The forth field 134 may identify a specific customer or a customer that is associated with the location, e.g. the customer's reserved seating location. The fifth field 135 may display an itinerary. The sixth field 136 may display a dynamic updated status, e.g., status of bag location. The last field 137 may include special or other status information, e.g., meal type. Any field may be dynamically updated. Any field may have a non-editable display portion. The dynamically updated fields may include other information such as when the activity will begin or end, or when the flight will depart or arrive.

Although the example in FIG. 3 shows an embodiment of an electronic updateable static display 130 for use in the airline industry, the display field(s) may be customized for any other industry. Furthermore, the placard of FIG. 3 may be customized for any seating location or for other locations requiring specific location designation, e.g., a reserved table at a restaurant or reserved seat at a movie theater.

Figure 4:
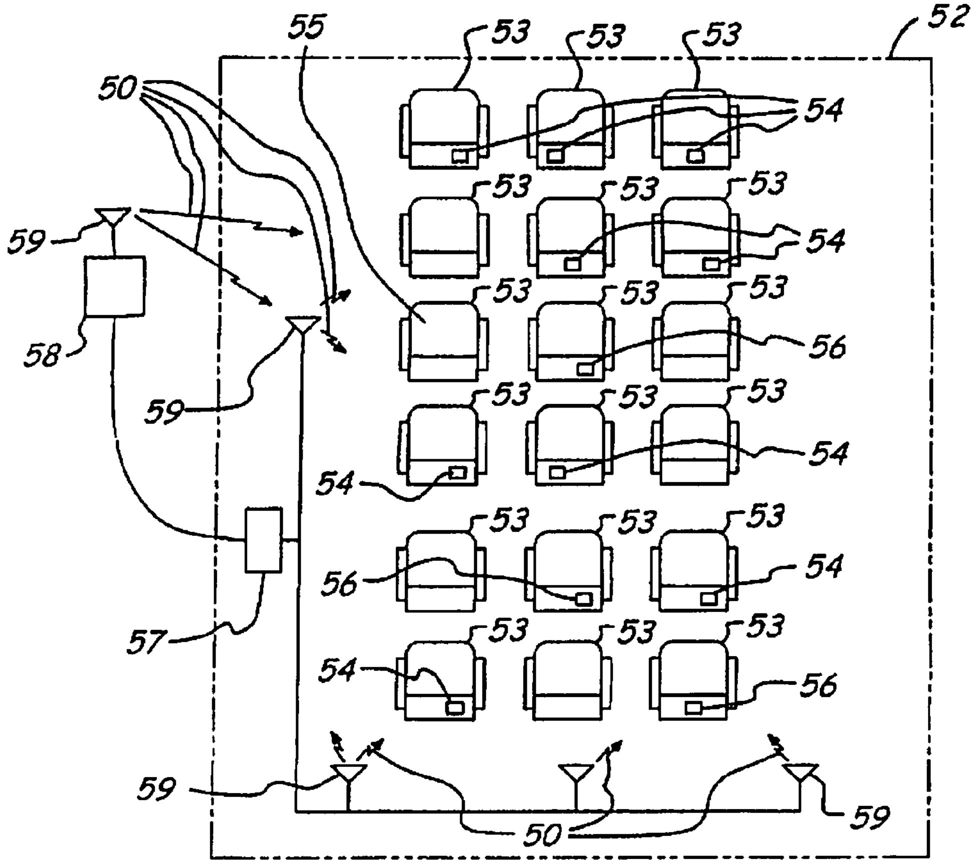
FIG. 4 shows a plan view of a seating facility in which the present disclosure is used.

FIG. 4 shows a plan view of a seating facility 52 in which the present disclosure may be used. The seating facility 52 is shown having seats 53 with placards 54 and multiple placards 56 coupled to the seats 53. Seat 55 is shown not having a placard. The other seats 53 have either a placard 54 or multiple placards 56, wherein each of the plurality of placards are visibly locatable and associated with a seating position. The placard 54 uniquely identifies the seat 53 to which the placard 54 is coupled using a conventional coupling device. The multiple placards 56 uniquely identify the seats 53 to which it is coupled by means of a conventional coupling device or is closely associated with.

Each placard 54, 56 within the seating facility 52 may receive a signal 50 that is transmitted by transmitter 57 or transceiver 58. Only one transmitter 57 or transceiver 58 is required to transmit a signal and may be inside or outside of the seating facility 52 so long as the signal 50 is transmitted to the placards 54, 56. There may be one or more antennas 59 which may be inside or outside of the seating facility 52.

The signal 50 may contain any or all of the identification codes of each placard 54 or multiple placards 56 and the corresponding messages to be displayed upon each placard 54 or multiple placards 56. The signal need not contain identification codes and messages for all of the placards. A controller may be coupled using the conventional coupling device well known to those skilled in the art to the transmitter for generating the signal 50, wherein the signal 50 comprises one or more identification codes, each identification code may be associated with one of the plurality of placards, each identification code may have a customer specific message associated with it. The signal may contain a customer specific message that is displayed on the electronic updateable static display and includes a seat identification and a user selected name. Also, a signal may be transmitted for the purpose of charging the placards.

Figure 5:
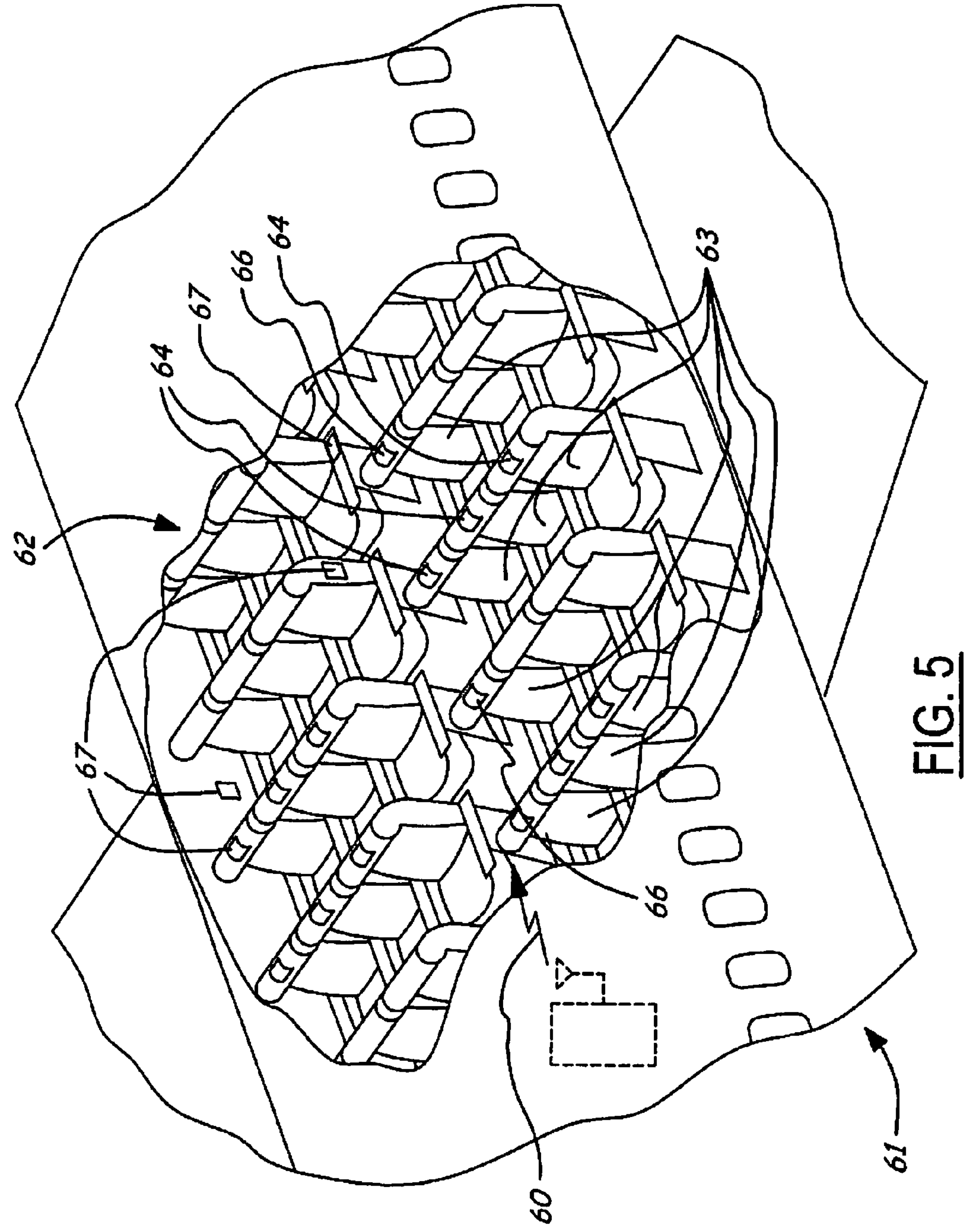
FIG. 5 is a perspective view of a seating location (depicted in an airplane) using the present disclosure.

FIG. 5 is a perspective view of a seating location 62 (depicted in an airplane 61) using the present disclosure to advantage. Each seat 63 may have a placard 64 or multiple placards 66 coupled to or associated with the seating location. The placard 67 may be coupled to the armrest, the seat side, the seat top, the wall or any other compatible location, so long as the placard 67 is visibly locatable and associable with a seat 63. The coupling of the placard is achieved using the well-known and conventional coupling devices. The signal 60 may be generated from a transmitter or transceiver located in or out of the seating location 62.

A method of using the disclosure to advantage may be accomplished by: generating a signal having one or more placard identification codes and a customer specific message associated with each of the placard identification codes from a database; transmitting the signal using a transmitter; receiving the signal on an antenna coupled using a conventional coupling device to a receiver on the placard; charging a capacitor coupled using a conventional coupling means to the receiver using the received signal; and displaying a customer specific message on an electronic updateable static display which is coupled by means of a conventional coupling device to the capacitor and the receiver, by using the energy from the capacitor when a portion of the one or more placard identification codes is the identification code of the placard receiving the signal.

The customer specific message may be associated with a reserved seat for a specific customer.

Retrieving the customer specific message may be from an airline reservation or boarding system.

After the placard has received the signal and updated its display, it may transmit a return signal indicative of the electronic updateable static display having been set with the transmitted message if the placard is of the transponder type.

Also, the placard when supplied with a memory and timer may display one of the messages that are stored in the memory when a time period elapses by using energy from the capacitor or from a backup power source to power the display when displaying the new message. The placard waits a specified time period as determined by the timer and then displays one of the messages retrieved from memory. The timer is initiated by the action of displaying a message on the electronic updateable static display.

Messages may be retrieved from an In-Flight Entertainment, airline reservation, boarding or other system 100 connected to the placard wirelessly via a coupler 102 connected to the transmitter or receiver, and stored into the memory for later retrieval and display upon the EUSD.

The placard may be used to display upon the EUSD other types of information such as advertisements and text messages. The information to be displayed might be received from an intranet, internet or other information system, e.g. information provided by a system like Connexion by Boeing. The information could be tailored for the uses for which the placard is placed. Information could include local and/or destination time/weather, arrival/connection gate updates with estimated walking distances/times between gates, e-mail, lodging/car reservations, etc., personalized for each passenger. Passengers may be able to carry the placard with them, having this information displayed on the EUSD in hand. Although this example is specific to the use of the disclosure in an airplane, the disclosure may be used in other applications and environments as would be readily apparent to all.

The placard may also have a function for commanding the EUSD display to be set with a void, clear, opaque or dark screen; or variations there between. This function is not an on/off function, but is characteristic thereof. This function may allow passenger or users the option of switching the EUSD display to display a void, clear, opaque or dark screen.

Figure 6:
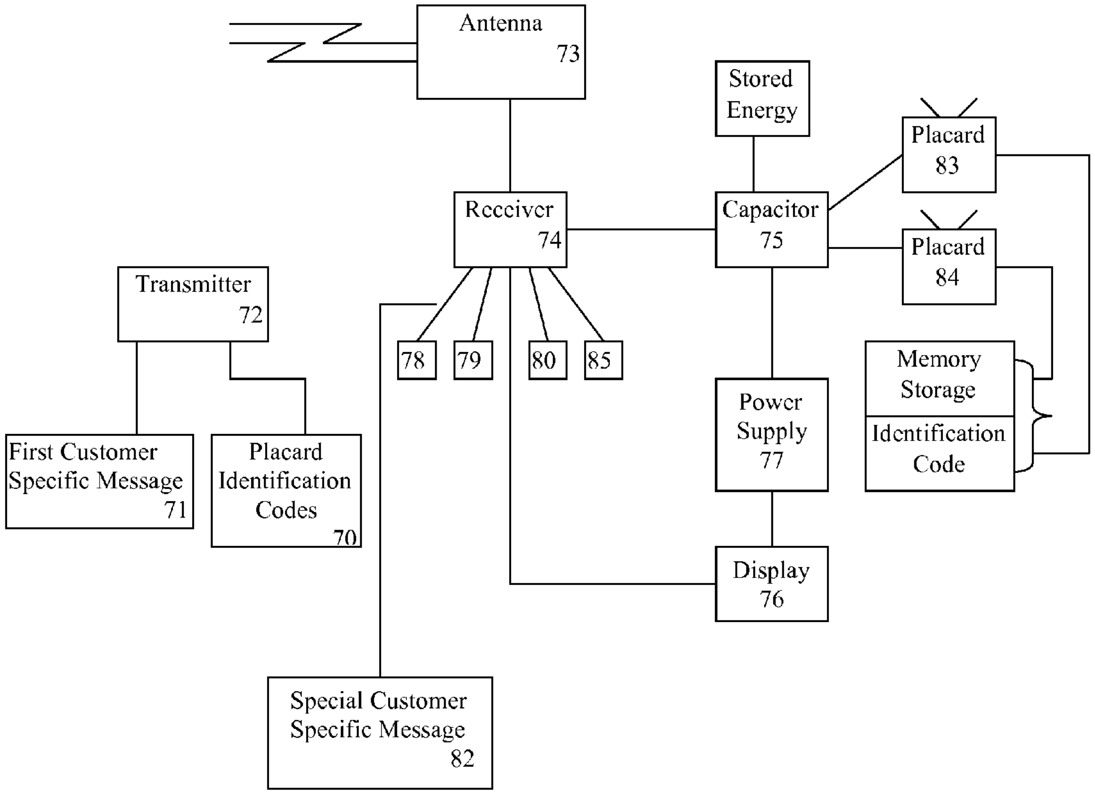
FIG. 6 shows a flow chart illustrating how one embodiment of the system functions.

A method of using one embodiment of the disclosed system is illustrated in FIG. 6. The method is carried out by generating a signal having one or more placard identification codes 70 and a first customer specific message 71 associated with each of the placard identification codes 70 from a database (not shown); transmitting the signal using a transmitter 72; receiving the signal on an antenna 73 coupled using a conventional coupling device (not shown) to a receiver 74; charging a capacitor 75 coupled using a conventional coupling means (not shown) to the receiver 74 using the received signal; displaying a customer specific message 71 on an electronic updateable static display device 76, which is coupled by means of a conventional coupling device to the capacitor 75 and the receiver 74, by using the energy from the capacitor and a power source when a portion of one or more of the placard identification codes is the identification codes of the placard 83, 84 receiving the signal. The receiver 74 may also be coupled by at least one conventional coupler (not shown) to one or more of an in-flight entertainment system 78, an on-line reservation system 79, an airline boarding system 80 and a text messaging system 85, receiving a second customer specific message 82 therefrom.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

We claim:

1. A system for dynamic seat labeling of a plurality of seats in a seating area by displaying customer specific messages which comprises:

a controller coupled to a transmitter, which is coupled to one or more antennas, said controller programmed to download seat reservation data from an external system containing a database, and to generate a signal from said seat reservation data, said signal comprising a plurality of identification codes, and a plurality of customer specific messages, said controller further programmed to transmit said signal through said transmitter; and a plurality of wireless placards, wherein each placard comprises:

a receiver having a memory storing an identification code and an antenna for receiving said signal, wherein the receiver is one of an active or passive RF receiver and comprises a transponder and wherein a message memory is coupled to the receiver for storing one or more messages for displaying upon an updatable static display;

a transponder having a memory storing an identification code and an antenna for receiving and acknowledging a signal;

a capacitor coupled to the transponder;

at least one coupler connected to at least one member selected from the group comprising an in-flight entertainment system, an airline reservation system, and an airline boarding system for receiving a second customer specific message therefrom;

an electronic updateable static display comprising one of an electronic paper display or a photonic ink display coupled to the transponder and the at least one coupler and powered by the capacitor for displaying said first and second customer specific messages when said first portion of the signal matches the identification code of the device, whereby the capacitor is capable of being charged by the signal wherein the signal is acknowledged after the electronic updateable static display has displayed the customer specific message; and a timer determining for how long the customer specific message is displayed and when the customer specific message will be replaced with a stored message or a new customer specific message.

2. A method for dynamic seat labeling of a plurality of seats in a seating area, said seating area having a plurality of wireless placards having a display and a timer, each of said placards visibly associated with and uniquely identifying a different seat in the seating area, by displaying customer specific messages, comprising:

downloading seat reservation data from a system having a database, said system being external to said seating area;

generating a signal from said seat reservation data having one or more placard identification codes and a first customer specific message associated with each of the placard identifications from a database;

transmitting the signal to said plurality of wireless placards using a transmitter and one or more antennas;

receiving the signal on an antenna coupled to a receiver within said plurality of wireless placards;

charging a capacitor coupled to the receiver on each of one or more placards using the energy received from the signal;

retrieving a second customer specific message associated with each of the placard identifications through at least one coupler from at least one member selected from the group comprising an in-flight entertainment system, an airline reservation system, and an airline boarding system, wherein said at least one coupler being coupled to the receiver and said at least one member;

displaying the first and second customer specific messages on an electronic updateable static display, which is coupled to the capacitor, the at least one coupler and the receiver, by using the energy from the capacitor when a portion of the one or more placard identifications is the placard receiving the signal;

waiting for a specified period by using a timer coupled to a memory that is started upon the action of displaying the customer specific message on the electronic updateable static display, and displaying an updated message stored in the message memory when the time elapses by using energy from the capacitor or from a backup power source;

transmitting a return signal indicative of the electronic updateable static display having been set with the transmitted message;

retrieving the customer specific message from an airline reservation or boarding system; and storing the messages retrieved from an In-Flight Entertainment, airline reservation or boarding system in the message memory.

3. The system of claim 1, wherein:

each of said customer specific messages comprises placard type data, seat location data, customer identification data, itinerary data, and dynamic updated status data; and the display on each of said placards comprises a first field for displaying said placard type data, a second field for displaying said seat location data, a third field for displaying said customer identification data, a fourth field for displaying said itinerary data, and a fifth field for displaying said dynamic updated status data.

4. The system of claim 1, wherein each of said placards is mounted on a seat-shoulder of each of said plurality of seats.

5. The system of claim 4, wherein each placard is located in a sleeve on the seat-shoulder.

6. The system of claim 1, wherein:

the system is located on an airplane; and said controller is programmed to cause the transmitter to transmit the signal to update the display on each of said placards at least once during each flight-leg.

7. The system of claim 1, wherein:

said receiver acknowledges said signal after the customer specific message is displayed.

8. The system of claim 1, wherein the identification codes are one of a device descriptive identity, a user selectable identity or a unique identity.

9. The system of claim 1, wherein each of the placards further comprises a power source selected from the group consisting of a solar cell or a battery.

10. The system according to claim 7, wherein the receiver comprises a transponder.

11. The system according to claim 10, wherein the transponder comprises an RF receiver.

12. The method of claim 2, wherein:

said customer specific messages comprise placard type data, seat location data, customer identification data, itinerary data, and dynamic updated status data; and said placard type data is displayed in a first field of the display, said seat location data is displayed in a second field of the display, said customer identification data is displayed in a third field of the display, said itinerary data is displayed in a fourth field of the display, and said dynamic updated status data is displayed in a fifth field of the display.

13. The method of claim 2, wherein each of said placards is mounted on a seat-shoulder of each of said plurality of seats.

14. The method of claim 13, wherein each of said placards is located in a sleeve on the seat-shoulder.

15. The method of claim 12, wherein the seating area is located on an airplane, the method further comprising:

transmitting the signal to update said first, second, third, fourth and fifth fields of the display at least once during each flight-leg.

16. The method of claim 2, further comprising:

acknowledging a signal received by a placard after the customer specific message has been displayed.

17. The method of claim 2, wherein the identification codes are one of a device descriptive identity, a user selectable identity or a unique identity.

* * * * *